US008823366B2

(12) United States Patent
Babin

(10) Patent No.: US 8,823,366 B2
(45) Date of Patent: Sep. 2, 2014

(54) NON-CONTACTING SENSOR ASSEMBLY

(75) Inventor: Brian G. Babin, Bristol, IN (US)

(73) Assignee: CTS Corporation, Elkhart, IN (US)

( * ) Notice: Subject to any disclaimer, the term of this patent is extended or adjusted under 35 U.S.C. 154(b) by 713 days.

(21) Appl. No.: 12/947,162

(22) Filed: Nov. 16, 2010

(65) Prior Publication Data

US 2011/0115480 A1    May 19, 2011

Related U.S. Application Data

(60) Provisional application No. 61/281,331, filed on Nov. 16, 2009.

(51) Int. Cl.
*G01B 7/30* (2006.01)
*G01D 5/14* (2006.01)

(52) U.S. Cl.
CPC ..................... *G01D 5/145* (2013.01)
USPC .................................. 324/207.25

(58) Field of Classification Search
USPC ............ 324/207.23–210, 200, 256, 260, 263, 324/500, 600, 631
See application file for complete search history.

(56) References Cited

U.S. PATENT DOCUMENTS

| | | | |
|---|---|---|---|
| 4,430,634 A | 2/1984 | Hufford et al. |
| 5,332,965 A | 7/1994 | Wolf et al. |
| 5,712,561 A | 1/1998 | McCurley et al. |
| 5,757,179 A | 5/1998 | McCurley et al. |
| 5,798,639 A | 8/1998 | McCurley et al. |
| 5,818,223 A | 10/1998 | Wolf |
| 6,031,448 A | 2/2000 | Starkweather et al. |
| 6,124,709 A | 9/2000 | Allwine |
| 6,188,216 B1 | 2/2001 | Fromer |
| 6,211,668 B1 | 4/2001 | Duesler et al. |
| 6,323,641 B1 | 11/2001 | Allwine |
| 6,323,643 B1 | 11/2001 | Kordecki |
| 6,329,897 B1 | 12/2001 | Osmer et al. |
| 6,362,719 B1 | 3/2002 | Osmer et al. |
| 6,367,337 B1 | 4/2002 | Schlabach |
| 6,441,626 B1 | 8/2002 | Mase |
| 6,486,767 B1 | 11/2002 | Rainey |
| 6,639,508 B1 | 10/2003 | Martin |
| 6,703,828 B2 | 3/2004 | Babin et al. |
| 6,710,593 B2 | 3/2004 | Babin et al. |
| 6,779,389 B2 | 8/2004 | Kubota et al. |

(Continued)

FOREIGN PATENT DOCUMENTS

| EP | 1 345 005 | 9/2003 |
|---|---|---|
| GB | 2267154 | 11/1993 |

(Continued)

*Primary Examiner* — Melissa Koval
*Assistant Examiner* — Trung Nguyen
(74) *Attorney, Agent, or Firm* — Daniel J. Deneufbourg

(57) ABSTRACT

A non-contacting sensor assembly including a connector assembly and a magnet assembly. The connector assembly includes a sensor coupled directly to the end of the terminals of the connector assembly. A sleeve is overmolded around and seals the sensor and the terminals. A capacitor is soldered in a recess in the terminals. The terminals include flexible regions, such as regions of reduced thickness, which reduce the effects of thermal expansion/contraction stresses on the solder. In one embodiment, the sensor assembly is a rotary position sensor assembly in which the magnet assembly is molded into a rotatable drive arm assembly located in a housing, the connector assembly is coupled to the housing, and the sensor extends into the housing and into adjacent relationship with the magnet assembly.

9 Claims, 7 Drawing Sheets

(56) References Cited

U.S. PATENT DOCUMENTS

| | | |
|---|---|---|
| 6,819,102 B2 | 11/2004 | Hagio et al. |
| 6,946,831 B2 | 9/2005 | Miyata et al. |
| 7,302,940 B2 | 12/2007 | Schneider et al. |
| 7,370,853 B2 | 5/2008 | Urquidi et al. |
| 7,378,842 B2 | 5/2008 | Babin |
| 7,382,120 B2 | 6/2008 | Narasimhan et al. |
| 7,439,732 B2 | 10/2008 | LaPlaca |
| 7,863,527 B2 | 1/2011 | Vich |
| 2003/0160606 A1 | 8/2003 | Babin |
| 2004/0032251 A1 | 2/2004 | Zimmerman et al. |
| 2004/0080317 A1* | 4/2004 | Collins et al. ............ 324/262 |
| 2006/0220638 A1 | 10/2006 | Urquidi et al. |
| 2007/0008063 A1 | 1/2007 | Lawrence et al. |
| 2007/0068499 A1 | 3/2007 | Schneider et al. |
| 2008/0218158 A1 | 9/2008 | Carlson et al. |
| 2009/0183558 A1* | 7/2009 | Houjie et al. ............ 73/114.26 |
| 2010/0207616 A1 | 8/2010 | Wolschlager et al. |
| 2011/0079138 A1* | 4/2011 | Storrie et al. ............ 91/1 |

FOREIGN PATENT DOCUMENTS

| | | |
|---|---|---|
| JP | 8 241806 | 9/1996 |
| JP | 2001124508 | 5/2001 |
| JP | 2002055005 | 2/2002 |

* cited by examiner

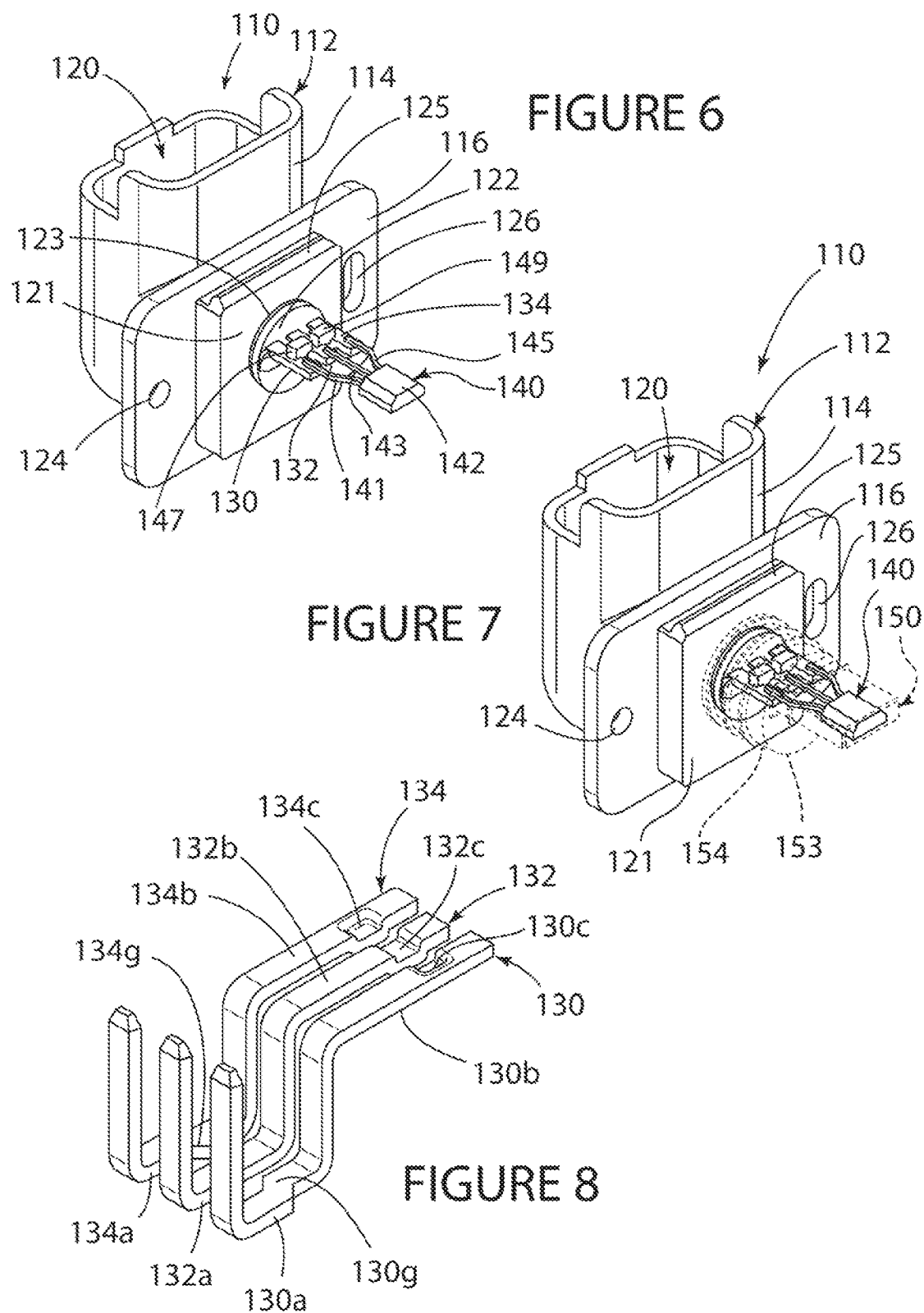

NON-CONTACTING SENSOR ASSEMBLY

CROSS-REFERENCE TO RELATED APPLICATION

This application claims the benefit of the filing date and disclosure of U.S. Provisional Application Ser. No. 61/281,331 filed on Nov. 16, 2009 which is explicitly incorporated herein by reference as are all references cited therein.

FIELD OF THE INVENTION

The present invention relates to a sensor and, more specifically, to a non-contacting sensor assembly.

BACKGROUND OF THE INVENTION

One important advancement in sensor technology has been the development of non-contacting sensors such as, for example, rotary position sensors, linear position sensors, and speed sensors. As a general proposition, a non-contacting sensor such as, for example, a non-contacting position sensor ("NPS") does not require physical contact between the signal generator and the sensing element and utilizes magnets to generate magnetic fields that vary as a function of position and devices to detect varying magnetic fields to measure the position of the components to be monitored.

A Hall effect device, or any other suitable device designed to sense magnetic fields, is used to produce an electrical signal that is dependent upon the magnitude and/or polarity of the magnetic flux incident upon the sensing device. The sensing device may be physically attached to the component to be monitored and move relative to the stationary magnets as the component moves. Conversely, the sensing device may be stationary with the magnets affixed to the component to be monitored. In either case, the position of the component to be monitored can be determined by the electrical signal produced by the sensing device.

The use of a non-contacting sensor such as, for example, an NPS presents several distinct advantages over the use of the contacting sensor. Because an NPS does not require physical contact between the signal generator and the sensing device, there is less physical wear during operation, resulting in greater durability of the sensor. The use of an NPS is also advantageous because the lack of any physical contact between the items being monitored and the sensor itself results in reduced drag upon the component by the sensor.

This invention is directed to new an improved features for a non-contacting sensor assembly.

SUMMARY OF THE INVENTION

The present invention is directed broadly to a non-contacting sensor assembly which comprises a sensor assembly with terminals, and a sensor which is coupled directly to the terminals of the connector assembly. In one embodiment, the sensor includes leads which are coupled to the terminals of the connector assembly.

The sensor assembly further comprises a protective sleeve which surrounds the terminals of the connector assembly and the sensor. In one embodiment, the protective sleeve is made of a soft and flexible elastomeric material which is overmolded around and seals the sensor and the terminals of the connector assembly.

In one embodiment, the terminals include respective first segments which are fixed in the connector assembly and respective second free segments protruding out of the connector assembly. Further, in one embodiment, an electrical element such as, for example, a capacitor, is mounted on a flexible region of one or more of the second free segments of the terminals and the distance between the first segments of the terminals is greater than the distance between the second free segments of the terminals.

In one embodiment, the electrical element is seated in a recess which is defined in the terminals.

In one embodiment, the sensor assembly is a rotary position sensor assembly which comprises a housing, a rotatable drive arm assembly located in the housing, and a magnet assembly which is located in the housing, is coupled to the drive arm assembly, and includes a pair of spaced-apart magnets. The sensor extends into the housing between the pair of spaced-apart magnets.

In another embodiment, the sensor assembly is a linear position sensor assembly which comprises a housing, a magnet assembly which is located in the housing and is coupled to an element adapted for linear movement in the housing, and the magnet assembly includes a pair of spaced-apart magnets. The sensor extends into the housing between the pair of spaced-apart magnets.

In a further embodiment, the sensor assembly is a speed sensor assembly comprising a housing, a rotatable wheel in the housing, and a magnet assembly located either on the wheel or adjacent the sensor. The sensor extends into the housing into a relationship adjacent the wheel.

Still further, in one embodiment, the housing includes an interior cavity defined by an interior surface, the sensor extends into the interior cavity, and the sleeve includes at least a first rib which abuts against the interior surface of the housing to provide a seal between the connector assembly and the housing.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same:

FIG. 6 is a perspective view of the combination connector/terminal/sensor assembly of the non-contacting rotary position sensor assembly of FIG. 1;

FIG. 7 is a perspective view of the combination connector/terminal/sensor assembly shown in FIG. 6 with the sensor cover overmold assembly thereon shown in phantom;

FIG. 8 is an enlarged perspective view of the terminals of the combination connector/terminal/sensor assembly shown in FIGS. 6 and 7;

DETAILED DESCRIPTION OF THE EMBODIMENT

Figure 1:
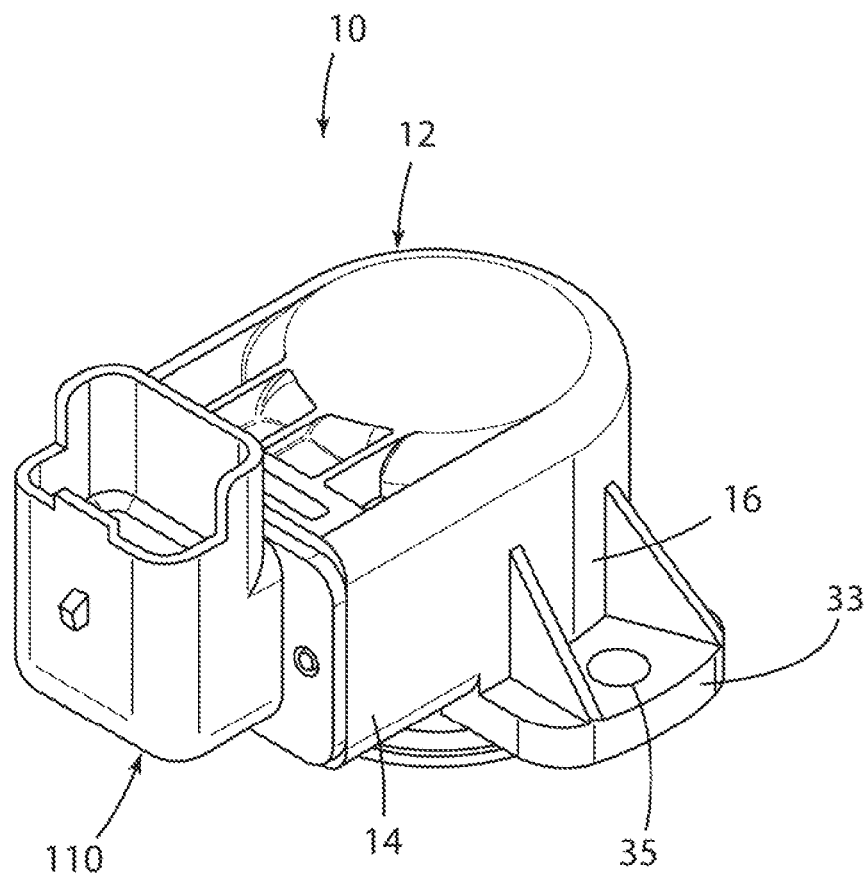
FIG. 1 is a perspective view of a non-contacting sensor assembly in accordance with the present invention which, in the embodiment shown, is the form of a non-contacting rotary position sensor assembly.
Figure 2:
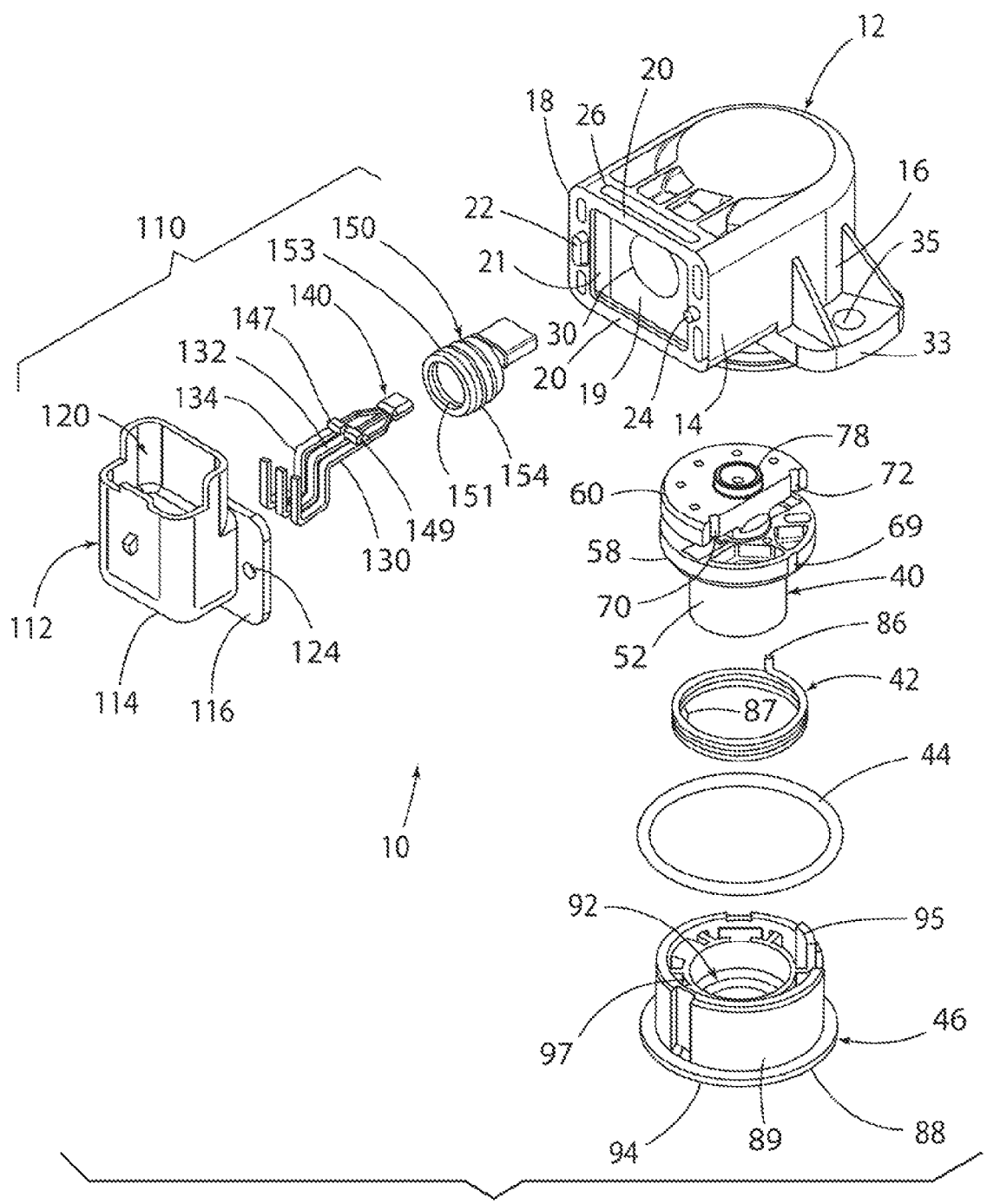
FIG. 2 is an exploded perspective view of the non-contacting rotary position sensor assembly of FIG. 1.
Figure 3:
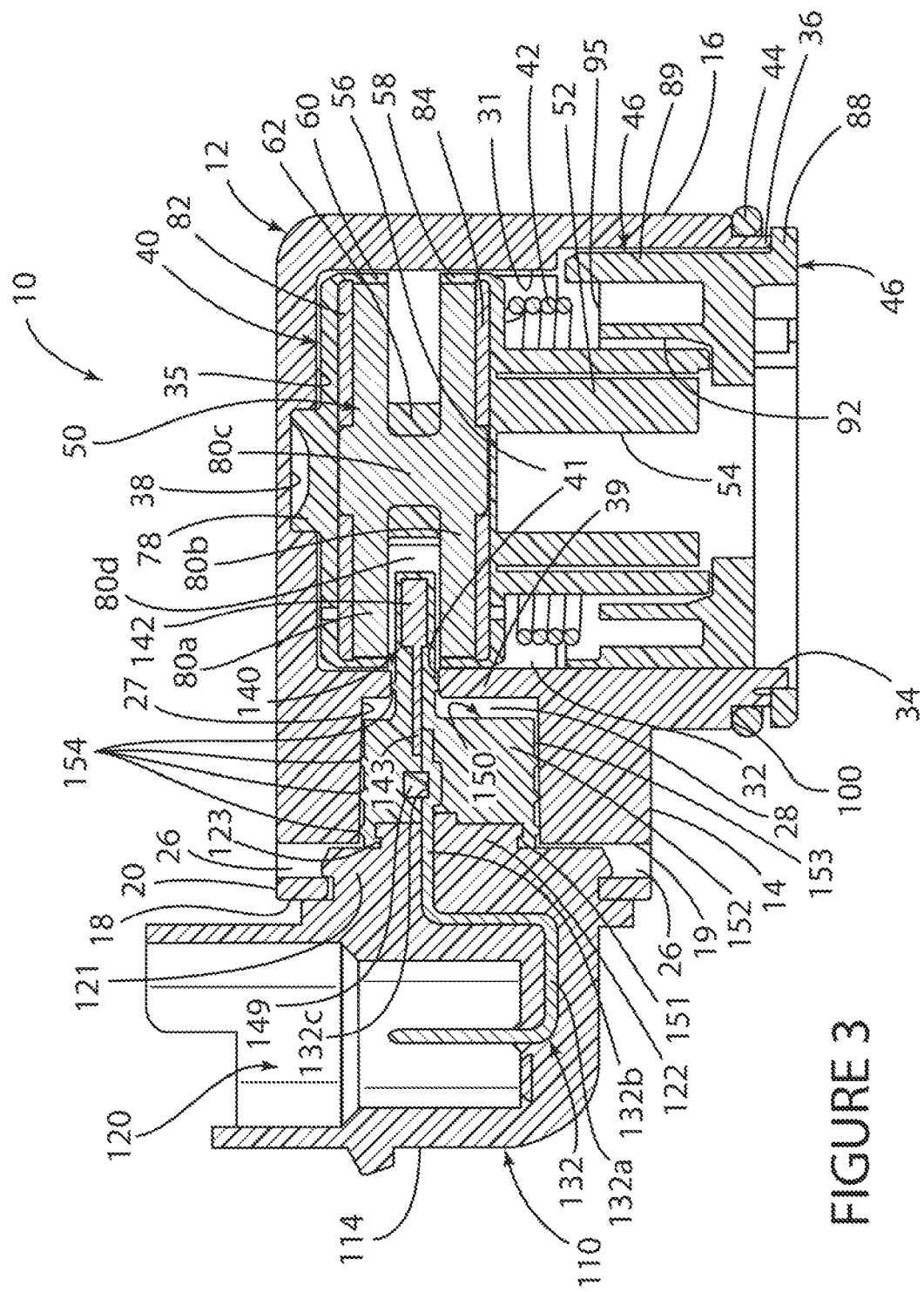
FIG. 3 is a vertical cross-sectional view of the non-contacting rotary position sensor assembly of FIG. 1.

FIGS. 1-3 depict one embodiment of a non-contacting sensor assembly in accordance with the present invention which is in the form of a non-contacting rotary position sensor assembly 10 comprising a housing 12 for a plurality of internal elements as described in more detail below. In the embodiment shown, housing 12 is generally in the shape of an elbow including a connector housing section 14 (FIGS. 1-3) and a drive arm housing section 16 (FIG. 3) unitary with and oriented in a direction generally normal to the connector housing section 14.

Connector housing section 14 includes a distal end 18 (FIGS. 2 and 3) defining a central, generally rectangularly-shaped flat interior wall 19 (FIGS. 2 and 3) and a flat peripheral and circumferentially extending lip or rim 20 (FIGS. 2 and 3) defined by shoulder 21 (FIG. 2) protruding generally normally outwardly from the wall 19. A pair of differently-sized pins or posts or guides 22 and 24 (FIG. 2) project generally normally outwardly from the exterior face of the opposed side wall portions of the rim 20 in a generally co-linear relationship. In the embodiment shown, pin 22 is oval-shaped and pin 24 is cylindrically-shaped. An elongate, generally rectangularly-shaped through aperture or slot 26 (FIGS. 2 and 3) is defined in and extends through respective top and bottom wall portions of the rim 20.

Connector housing section 14 includes an interior cylindrical surface 27 (FIG. 3) defining a first interior generally cylindrically-shaped cavity 28 (FIG. 3) which terminates at one end in a generally cylindrically-shaped opening 30 (FIG. 2) defined in the wall 19 of the connector housing section 14.

As shown in FIG. 3, housing section 16 includes an interior cylindrical surface 31 defining an interior generally cylindrically-shaped cavity 32 which, at one end, terminates in a generally cylindrically-shaped opening 34 in a distal end 36 of the housing section 16. The opposite end of the cavity 32 is in communication with the cavity 28 defined in the housing section 14. Interior surfaces 27 and 31 and respective cavities 28 and 32 are oriented in a generally normal relationship. The cavity 32 in housing section 16 is defined in part by a top interior horizontal surface 36 defining a recess or groove or slot 38.

As shown in FIG. 3, an interior wall 39 in the housing 12 separates the interior cavities 28 and 32 and includes an interior surface 41 defining a through aperture between the interior cavities 28 and 32.

As shown in FIGS. 1 and 2, a mounting flange 33 (FIGS. 1 and 2) protrudes outwardly from a lower edge of the exterior surface of the housing section 16. Flange 33 defines a through aperture 35 (FIGS. 1 and 2) adapted to receive a bolt (not shown) for coupling the sensor assembly 10 to the shaft (not shown) of the part (not shown) whose position is to be measured. Although not shown in any of the FIGURES, it is understood that a like flange diametrically opposed to flange 33 protrudes outwardly from the opposed side of the exterior surface of the housing section 16. Further, and although also not show in any of the FIGURES, it is understood that the through aperture 35 can also receive any suitable torque limiting insert designed to take up the force of the bolt (not shown) if necessary.

As shown in FIGS. 2 and 3, the cavity 32 of the housing section 16 houses a drive arm assembly 40, a return spring 42, and a retaining ring 46 as described in more detail below.

Figure 5:
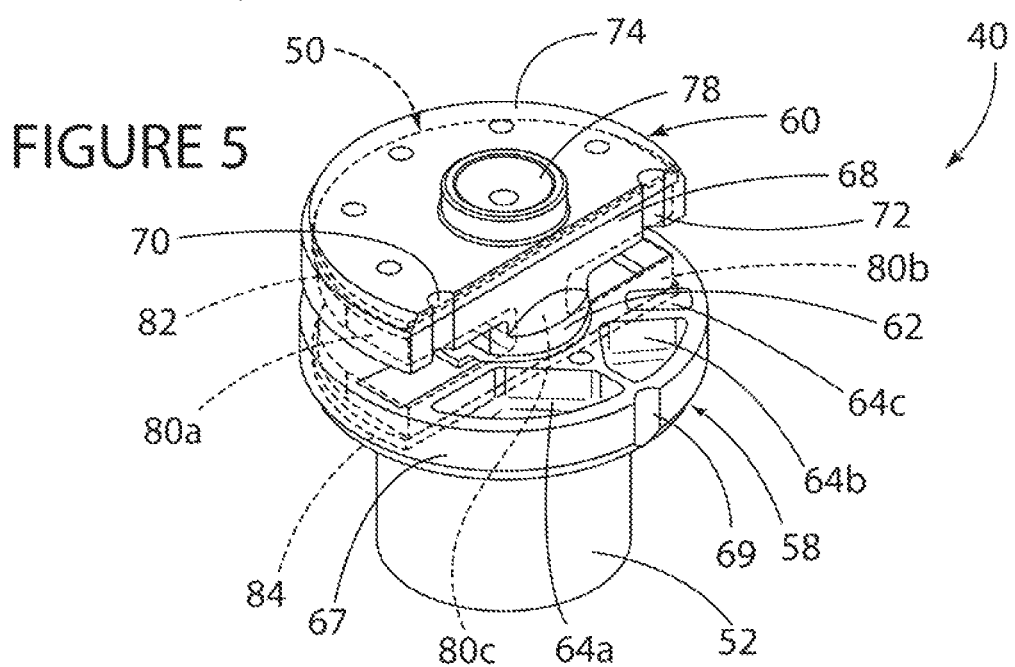
FIG. 5 is an exploded perspective view of the drive arm assembly of the non-contacting rotary position sensor assembly of FIG. 1 with the magnet assembly shown in FIG. 3 overmolded therein and shown in phantom.

As shown in FIGS. 2, 3, and 5, drive arm assembly 40 includes a cylindrical base 52 (FIGS. 2, 3, and 5) including an interior generally cylindrically-shaped surface 54 (FIG. 3) defining an interior cavity 56 (FIG. 3); a first generally circularly-shaped magnet retention overmolded platform 58 seated on top of and unitary with the base 52; and a second semi-circularly-shaped magnet retention overmold platform 60 spaced from and parallel to the platform 58. A generally cylindrically-shaped column 62 (FIGS. 3 and 5) extends unitarily between the respective overmold platforms 58 and 60 and supports the platform 60 above and in a spaced and parallel relationship to the platform 58.

As shown in FIG. 5, the platform 58 defines a plurality of recesses 64a, 64b, and 64c. Platform 58 additionally includes a peripheral circumferentially extending exterior face 67 defining at least one groove 69 extending between the top and bottom surfaces thereof. Platform 60, which is semi-circular in shape, includes a flat end face 68 defining a pair of spaced-apart grooves 70 and 72 extending between the top and bottom surfaces thereof. The grooves 70 and 72 are located adjacent and spaced from opposed peripheral edges of the face 68. A generally circular pin 78 (FIGS. 2, 3 and 4) protrudes unitarily outwardly from the center of the top surface 74 (FIG. 5) of the platform 60.

Figure 4:
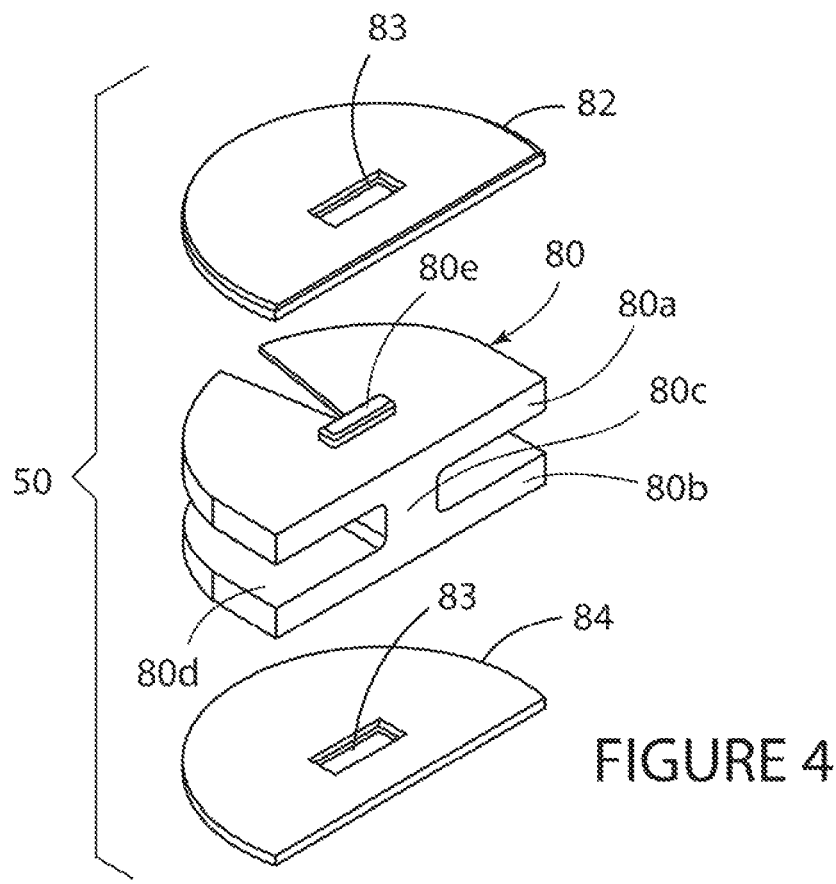
FIG. 4 is an exploded perspective view of the magnet assembly of the non-contacting rotary position sensor assembly of FIG. 1.

As shown in FIG. 4, magnet assembly 50 comprises a magnet 80 and respective magnet pole pieces 82 and 84 and is of the bi-polar, tapered magnet type disclosed in for example U.S. Pat. No. 6,211,668, the disclosure of which is incorporated herein by reference. Each of the magnet pole pieces 82 and 84 is generally semi-circular in shape and defines a generally rectangularly-shaped aperture 83. Magnet 80 includes upper and lower spaced-apart and parallel semi-circular magnet sections 80a and 80b which are joined together by a unitary central post 80c therebetween. A gap or space 80d is defined between the magnet sections 80a and 80b.

Each of the magnet sections 80a and 80b includes a generally rectangularly-shaped and generally centrally located projection 80e projecting outwardly from the outer surface thereof (only one of which is shown in FIG. 4) which is adapted to extend through respective apertures 83 in respective magnet pole pieces 82 and 84 when the magnet pole pieces 82 and 84 are coupled to the exterior surface of the respective magnet sections 80a and 80b during the assembly process for sensor assembly 10.

The magnet assembly 50 is overmolded into and made a part of the drive arm assembly 40 during the manufacturing process into an assembled relationship in which the post 80c of the magnet assembly 50 is overmolded into and made part of the post 62 of the drive arm assembly 40; the magnet section 80a and the pole piece 82 coupled thereto are overmolded into and made part of the platform 60 of the drive arm assembly 40; and the magnet section 80b and the pole piece 84 coupled thereto are overmolded into and made part of the platform 58 of the drive arm assembly 40.

Return spring 42, as shown in FIGS. 2 and 3, is of the helical type and includes respective bent distal end segments or extensions 86 and 87 (FIG. 2).

Retaining ring 46, as shown in FIGS. 3 and 4, includes a generally cylindrically-shaped base 88 and a generally cylindrically-shaped sleeve 89 together defining an interior through aperture 92.

As shown in FIG. 3, the drive arm 40 is inserted into the interior of the housing section 16 via and through the opening 34 in the distal end 36 of the housing section 16 and is mounted in the interior cavity 32 of the housing section 16 in a relationship wherein the pin 78 thereof extends into the recess 38 defined in the top interior surface 35 of the housing section 16 and the top surface 74 of the platform 60 is located adjacent the interior surface 36 of housing section 16. The pin 78 mounts the drive arm assembly 40 for rotation in the interior cavity 32 of the housing section 16.

As shown in FIG. 3, the return spring 42, which is also located in the interior cavity of the housing section 16, surrounds the base 52 of the drive arm assembly 40 and abuts against the lower surface of the platform 58 of the drive arm assembly 40. Although not shown in any of the FIGURES, it is understood that the distal end segment 86 of the return spring 42 extends into the slot or aperture 64c defined in the top exterior surface of the platform 58 of the drive arm assembly 40.

An O-ring 44 (FIGS. 2 and 3) is seated in an exterior circumferential groove or shoulder 100 (FIG. 3) defined at the distal end 36 of the housing section 16.

As shown in FIG. 3, the retaining ring 46 retains the drive arm assembly 40 and the return spring 42 in the housing section 16. Specifically, the retaining ring 46 is inserted into the interior of the housing section 16 during the assembly process via and through the opening 34 in the distal end 36 of the housing section 16 into a relationship where the base 52 of the drive arm assembly 40 extends into the through aperture 92 defined in the sleeve 89 of the retaining ring 46, and the return spring 42 is sandwiched between a top peripheral edge 95 of the sleeve 89 of the retaining ring 46 and the lower surface of the platform 58 of the drive arm assembly 40. The bent end 87 of the retaining ring 46 extends into one of the grooves 97 (FIG. 2) defined on the top of the sleeve 89 of the retaining ring 46. The O-ring 44 is sandwiched between the exterior shoulder 100 of the housing section 16 and the interior surface of the base or flange 88 of the retaining ring 46.

A connector assembly 110 (FIGS. 1, 2, 3, 6, and 7) is coupled to the distal end 18 of the housing section 14. As shown in FIGS. 2, 6, and 7, connector assembly 110, which may be made from a polymeric material or the like material, comprises a connector 112 including a terminal housing portion 114 and a bracket or flange 116. Terminal housing portion 114 defines an interior cavity 120 and the bracket includes a pair of diametrically opposed and generally co-linear apertures 124 and 126 are defined centrally along respective opposed side edges of the bracket 116. In the embodiment shown, aperture 124 is generally in the shape of a circle while aperture 126 is generally in the shape of a circle.

In the embodiment shown, the bracket 116 defines a central, generally square-shaped platform or plug 121 projecting outwardly from an exterior surface thereof. The plug 121 includes an elongate tongue 125 formed and extending along, and protruding outwardly from, a top wall portion thereof. Another tongue (not shown) similar to the tongue 125 extends along, and protrudes outwardly from, a lower wall portion of the plug 121 in a relationship diametrically opposed and parallel to the tongue 125.

Moreover, in the embodiment shown, a generally circular overmold neck or projection or interface 122 (FIGS. 3 and 6) protrudes outwardly from the outer face of the platform 121. The overmold neck 122 includes a circumferentially extending outer surface or rim defining a circumferentially extending groove or recess or channel 123 (FIGS. 3 and 6).

A plurality of terminals 130, 132, and 134 are housed in and extend through the connector assembly 110 (FIGS. 2, 3, 6, and 8). Each of the terminals 130, 132, and 134 includes a respective U-shaped first segment or section 130a, 132a, and 134a (FIG. 8) rigidly fixed in and to the polymeric material defining the connector assembly 110 and a generally horizontal second free segment or section 130b, 132b, and 134b extending unitarily and freely outwardly from the U-shaped section 130a, 132a, and 134a respectively.

Each of the straight terminal segments 130b, 132b, and 134b includes a free distal end defining respective top recesses 130c, 132c, and 134c (FIG. 8). Moreover, and as shown in FIG. 8, each of the two outside terminals 130 and 134 and, more specifically, the respective U-shaped segments 130a and 134a thereof, include inwardly projecting respective bends 130g and 134g defined therein which define and create a connector assembly 110 in which the spacing or gap between the straight segments 130b, 132b, and 134b of the respective terminals 130, 132, and 134 is less than the spacing or gap between the U-shaped segments 130a, 132a, and 134a of the respective terminals 130, 132, and 134.

Terminals 130, 132, and 134 are housed in and extend through the connector assembly 110 in a relationship wherein U-shaped segments 130a, 132a, and 134a are located in the cavity 120 of terminal housing 114; the straight segments 130b, 132b, and 134b extend through the body of the bracket 116, the platform 121 and the overmold projection 122; and the distal recessed ends of the respective straight segments 130b, 132b, and 134b protrude outwardly from the exterior surface of the bracket 116 and, more specifically, outwardly from the exterior surface of the overmold projection 122.

A sensor assembly 140 (FIGS. 2, 6, and 7) is coupled directly, as by soldering or welding, to the ends of the straight terminal sections 130b, 132b, and 134b of the respective terminals 130, 132, and 134 of the connector assembly 110. The sensor assembly 140 includes a sensor 142 which, in the embodiment shown, is of a hall effect integrated circuit chip type available from, for example, Melexis Corporation and includes a plurality of leads 141, 143, and 145 which are coupled directly to, as by soldering or welding or the like, and extend generally co-planarly outwardly from, the ends of the respective straight terminal segments 130b, 132b, and 134b of the respective terminals 130, 132, and 134.

An electrical component such as, for example, a capacitor 147 (FIG. 6), which may be made of a ceramic or the like material, is seated and soldered into the recess 130c and a portion of the recess 132c defined in the distal end of respective terminals 130 and 132. Another electrical component such as, for example, another capacitor 149, also made of a ceramic or the like material, is seated and soldered in the recess 134c and a portion of the central recess 122c defined in the distal end of respective terminals 134 and 132.

The coupling of the sensor assembly 140 directly to the terminals 130, 132, and 134 and the mounting of the capacitors 147 and 149 directly to the surface of the terminals 130, 132, and 134 eliminates the need for a separate printed circuit board or the like supporting and mounting structure in the interior of the housing 12 for the sensor 140 and the capacitors 147 and 149.

Moreover, and inasmuch as the capacitors 147 and 149 are seated on and extend between adjoining terminals 130, 132, and 134, the size or length of the capacitors 147 and 149 determines the distance between the segments 130b, 132b, and 134b which, in turn, determines the angle of the respective bends 130g and 134g in the respective segments 130a and 134a of the respective terminals 130 and 134.

An elastomeric protective sensor cover or sleeve 150 (FIGS. 2, 3, and 7) is overmolded to and surrounds the sensor 142, the sensor leads 141, 143, and 145, the capacitors 147 and 149, the terminal end segments 130b, 132b, and 134b, and the peripheral circumferential rim of the overmold projection or neck 122. Sleeve 150 defines a closed end surrounding the sensor 142, an opposite open end including a peripheral circumferentially extending rim 151 (FIGS. 2 and 3), and a circumferentially extending outer surface 153 (FIGS. 2 and 3) including a plurality of spaced-apart, outwardly protruding, and circumferentially extending sealing ribs 154 (FIGS. 2 and 3) which eliminate the need for separate sealing o-rings in the sensor assembly 10. As shown in FIG. 3, the elastomeric material defining the rim 151 of the sleeve 150 flows and extends into the circumferential groove 123 of the overmold neck 122 during the overmolding of the sleeve 150 to the connector assembly 110 for an improved seal between the sensor 142 and the interior of the housing 12. The sleeve 150 is made of a soft and flexible elastomeric material and is formed and overmolded onto the connector assembly 110 and surrounding the sensor assembly 140 during the manufacturing process using a low pressure overmolding process which seals and protects the elements of the sensor assembly 140 and, more specifically, the elements of the sensor 142 in the housing 12.

Because the terminal segments 130a, 132a, and 134a are fixed and held in the polymeric material of the connector assembly 110 and further because the straight terminal segments 130b, 132b, and 134b extend freely outwardly from the end of the platform 121 and neck 122 of the connector assembly 100, the terminal segments 130b, 132b, and 134b bend and flex in response to the expansion or contraction of the polymeric material of the connector assembly 110 and/or the expansion or contraction of the elastomeric material of the sleeve 150 which, in turn, imparts mechanical stresses onto the capacitors 147 and 149 mounted to the terminals 130, 132, and 134 and, more specifically, to the solder by which the capacitors 147 and 149 are joined to the terminals 130, 132, and 134.

In accordance with the present invention, the reduced distance between the straight terminal segments 130b, 132b, and 134b, by virtue of the presence of the bends 130g and 134g in the respective terminals 130 and 134 reduces the volume of polymeric material between the respective straight terminal segments 130b, 132b, and 134b which, in turn, reduces the volume of polymeric material which will be subject to expansion and/or contraction which, in turn reduces the magnitude of the bending or flexing of the straight terminal segments 130b, 132b, and 134b which, in turn, reduces the magnitude of the mechanical stresses on the capacitors 147 and 149 which, in turn, reduces the risk of damage or failure of the solder which secures the capacitors 147 and 149 to the terminals 130, 132, and 134. The bending and flexing of the straight terminal segments 130b, 132b, and 134b may be further adjusted or controlled by adjusting or varying the width and/or thickness of the respective straight terminal segments 130b, 132b, and 134b.

The risk of solder joint failure is further minimized by the use of the recesses or coins 130c, 132c, and 134c in respective terminal segments 130b, 132b, and 133b which define and create regions in the respective terminals 130, 132, 134 which are of reduced thickness and cross-section and thus of increased flexibility relative to the other surrounding regions of the terminals 130, 132, and 134. The increased flexibility of the respective terminals 130, 132, and 134 in the region of the respective recesses 130c, 132c, and 134c causes such respective recessed regions to bend and flex in response to the application of mechanical stresses by the elastomeric material of the sleeve 150 to the capacitors 147 and 149 during thermal expansion/contraction which, in turn, again greatly reduces the risk of failure of the solder joints which couple the capacitors 147 and 149 to the terminals 130, 132, and 134.

The recesses or coins 130c, 132c, and 134c also provide and define pockets or receptacles in the respective terminals 130, 132, and 134 for the capacitors 147 and 149.

Figures 9, 10:
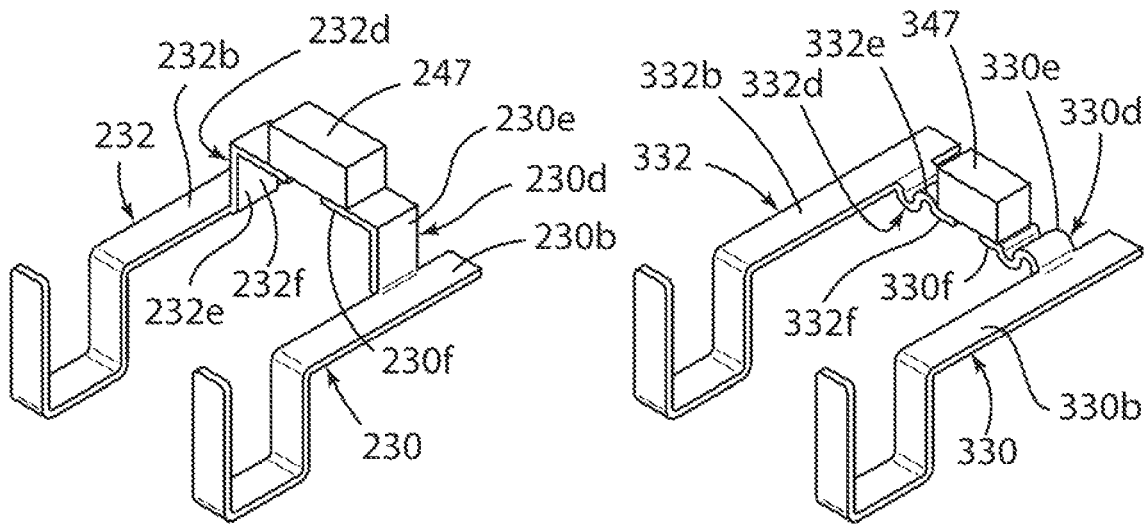
FIG. 9 is a simplified perspective view of an alternate embodiment of the terminals of the connector assembly of the present invention.
FIG. 10 is a simplified perspective view of yet another embodiment of the terminals of the connector assembly of the present invention.

FIGS. 9 and 10 depict alternate terminal embodiments incorporating alternate flexibility means or structure adapted to reduce the mechanical stresses on the capacitors 147 and 149 as a result of the bending and flexing of the free ends of the terminals in response to the thermal expansion/contraction of the polymeric material of the connector assembly 110 and, still more specifically, as a result the differences in the coefficients of thermal expansion/contraction of the polymeric and ceramic materials of the connector assembly 110 and the capacitors 147 and 149 respectively.

FIG. 9 shows the terminal end segments 230b and 232b of respective terminals 230 and 232. Each of the terminal end segments 230b and 232b includes a respective generally L-shaped extension or platform 230d and 232d. The platform 230d includes a post or column 230e projecting unitarily normally upwardly from an interior edge of the terminal segment 230b and a flat plate or base 230f projecting unitarily normally inwardly from a distal end of the post or column 230e. The platform 232d includes a post or column 232e projecting unitarily normally upwardly from an interior edge of the terminal segment 232b and a flat plate or base 232f projecting unitarily normally inwardly from a distal end of the post or column 232e. The platforms 230d and 232d are diametrically opposed and face each other and the respective bases 230f and 232f thereof are spaced in a manner which allows the respective ends of a capacitor 247 to be seated on and soldered to the respective bases 230f and 232f thus creating a bridge between the two terminals 230 and 232.

The respective platforms 230d and 232d serve the same function as the respective recesses 130c and 132c defined in the terminals 130 and 132 shown in FIG. 8 and, more specifically, define respective flexible regions of the respective terminals 230 and 232 which bend and flex in response to the application of mechanical stresses on the capacitor 247 during thermal expansion/contraction of the polymeric material of the connector assembly 110 and the ceramic material of the capacitor 247 as described above which, again, greatly reduces the risk of failure of the solder joint which couples and secures the capacitor 247 to the respective bases 230f and 232f of respective terminals 230 and 232. The bending and flexing may be further enhanced by further reducing the thickness of the platforms 230d and 232d.

FIG. 10 shows the terminal end segments 330b and 332b of respective terminals 330 and 332. Each of the terminal end segments 330b and 332b includes a respective extension or platform 330d and 332d including a generally S-shaped segment 330e projecting unitarily outwardly from an interior edge of the terminal segment 330b and a terminal end plate or base 330f projecting unitarily outwardly from a distal end of the S-shaped segment 330e. The platform 332d includes a generally S-shaped segment 332e projecting unitarily outwardly from an interior edge of the terminal segment 332b and a flat plate or base 332f projecting unitarily outwardly from a distal end of the S-shaped segment 332e. The platforms 330d and 332d are diametrically opposed and face each other and the respective bases 330f and 332f thereof are spaced in a manner which allows the respective ends of a capacitor 347 to be seated on and soldered to the top surface of the respective bases 330f and 332f thus creating a bridge between the two terminals 330 and 332.

The respective platforms 330d and 332d serve the same function as the respective recesses 130c and 132c defined in the terminals 130 and 132 shown in FIG. 8 and, more specifically, define respective flexible regions of the respective terminals 330 and 332 which bend and flex in response to the application of mechanical stresses on the capacitor 347 during thermal expansion/contraction of the polymeric material of the connector assembly 110 and the ceramic material of the capacitor 347 which, again, greatly reduces the risk of failure of the solder joint which couples and secures the capacitor 347 to the respective bases 330f and 332f of respective terminals 330 and 332. The bending and flexing may be further enhanced by reducing the thickness of the platforms 330d and 332d.

Referring back to FIG. 3, the connector assembly 110 is coupled to the distal end 18 of the housing section 14 in a relationship wherein the plug 121 is located against the interior wall 19; the rim 20 surrounds the peripheral edge of the plug 121; the tongues 125 along the top and lower wall portions of the bracket 116 are fitted in the respective slots 26 defined in the top and bottom wall portions of the rim 20; the bracket 116 is abutted against the exterior face of the rim 20; the respective posts 22 and 24 on the rim 20 extend through the respective apertures 126 and 124 in the bracket 116; and the terminals 130, 132, and 134 are located in the cavity 28 in the housing section 14.

The complementary shapes of the post 22 and the aperture 126 on the one hand, and the post 24 and the aperture 124 on the other hand assures that the connector assembly 100 is always coupled to the housing section 14 in the correct orientation during the assembly process. Further, the posts 22 and 24 may be heat staked to the bracket 116 during the assembly process to improve the retention of the connector assembly 110 to the housing section 14.

As shown in FIG. 3, the sensor assembly 140 extends from the terminals 130, 132, and 134 into the cavity 32 defined in the housing section 16 into a relationship wherein the sensor 142 is located in the space or gap defined between the platforms 58 and 60 of the drive arm assembly 60 and thus in the space or gap 80d defined between the magnet sections 80a and 80b which are overmolded in the respective platforms 58 and 60. As further shown in FIG. 3, the ribs 154 on the exterior surface of the overmold sleeve 150 abut against the interior surface 143 of the housing cavity 28 to provide a seal between the connector assembly 110 and the elements in the interior of the housing 12. Another of the ribs 154 abuts against the interior surface 41 of the interior wall 39 which separates the interior housing cavities 28 and 32 to seal the respective cavities 28 and 32 and also to support the sleeve 150 against vibration.

According to the invention, and although not shown in any of the FIGURES, it is understood that the shaft (not shown) of a device or part (not shown) whose rotation or position needs to be measured extends first through the cavity 92 in the retaining ring 46 and then into the cavity 56 defined in the base 52 of the drive arm assembly 40. The rotation of the shaft (not shown) causes the rotation of the drive arm assembly 40 which, in turn, causes the rotation of the magnets 80 overmolded therein which, in turn, causes changes in the strength and direction of the magnetic field or flux generated by the magnet 80 which is sensed by the sensor 142 and then subsequently converted into an electrical signal which allows the position of the shaft to be determined.

Numerous variations and modifications of the embodiment described above may be effected without departing from the spirit and scope of the novel features of the invention. It is thus understood that no limitations with respect to the specific system or module illustrated herein are intended or should be inferred. It is, of course, intended to cover by the appended claims all such modifications as fall within the scope of the claims.

Figure 11:
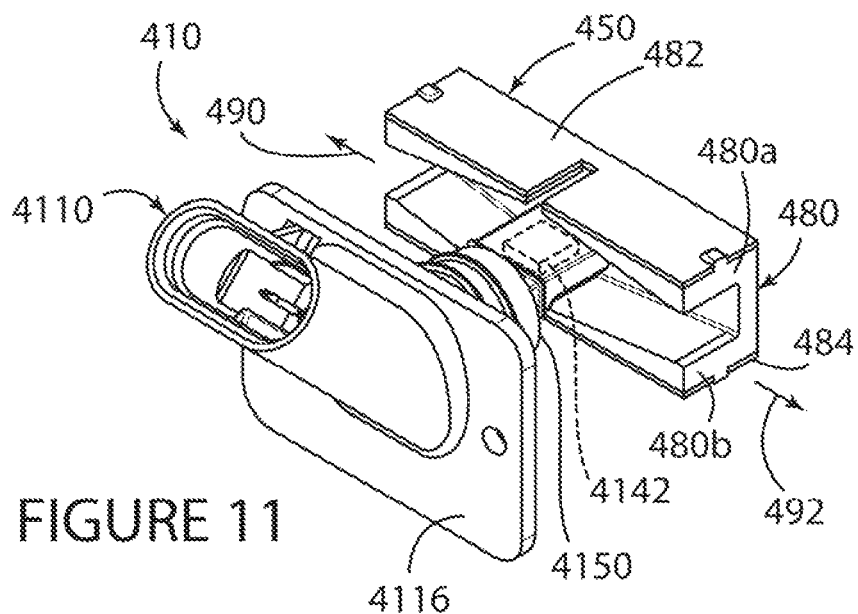
FIG. 11 is a simplified exploded perspective view of a linear position sensor assembly embodiment of the non-contacting sensor assembly of the present invention.

For example, it is understood that the invention encompasses sensor assembly embodiments other than the rotary position sensor assembly 10 including, for example, the linear position sensor assembly 410 shown in simplified form in FIG. 11 and which initially comprises a connector assembly 4110 incorporating all of the features and elements of the connector assembly 110 of the sensor assembly 10 shown in FIGS. 1-8 including, but not limited to, a sensor assembly including a sensor 4142 coupled directly to terminals (not shown) identical to the terminals 130, 132, and 134, and a sleeve 4150 identical to the sleeve 150 and thus the description of these and the other elements of the connector assembly 110 are incorporated herein by reference with respect to the connector assembly 4110.

The linear position sensor assembly 410 additionally comprises a magnet assembly 450 which, in a manner similar to the magnet assembly 50 of the sensor assembly 10 shown in FIGS. 1-8, includes a magnet 480 and respective magnet pole pieces 482 and 484 of the bi-polar, tapered magnet type as disclosed in for example U.S. Pat. No. 6,211,668, the disclosure of which is again incorporated herein by reference. Magnet 480 includes upper and lower spaced-apart and parallel magnet sections 480a and 480b which are joined together by a unitary post 480c therebetween. A gap or space 480d is defined between the magnet sections 480a and 480b.

Although not shown or described herein in any detail, it is understood that the magnet assembly 450, unlike the magnet assembly 50 described above, is adapted to be mounted in the interior of the case or housing (not shown) of, for example, a transmission assembly (not shown) and further that the magnet assembly 450 is adapted to be mounted or coupled to an element whose linear position or movement, in the direction of either of the arrows 490 and 492 shown in FIG. 11, is desired to be measured.

As although not shown or described herein in any detail, it is also understood that the connector assembly 4110 and, more specifically, the bracket 4116 thereof, is adapted for coupling to the wall (not shown) of the case or housing (not shown) of the transmission assembly (not shown) and further that the sensor 4140 located inside the sleeve 4150 is adapted to extend into such housing or case into a relationship wherein the sensor 4140 is located in the space or gap 480d defined between the magnet sections 480a and 480b of the magnet 480 of the magnet assembly 450.

Thus, in this embodiment, the linear movement of the magnet assembly 450 in the direction of the arrow 490 or the arrow 492 in FIG. 11 causes changes in the strength and/or direction of the magnetic field or flux generated by the magnet 480 which is sensed by the sensor 4140 and then subsequently converted into an electrical signal which allows the position of the element (not shown) coupled to the magnet assembly 450 to be determined.

Figure 12:
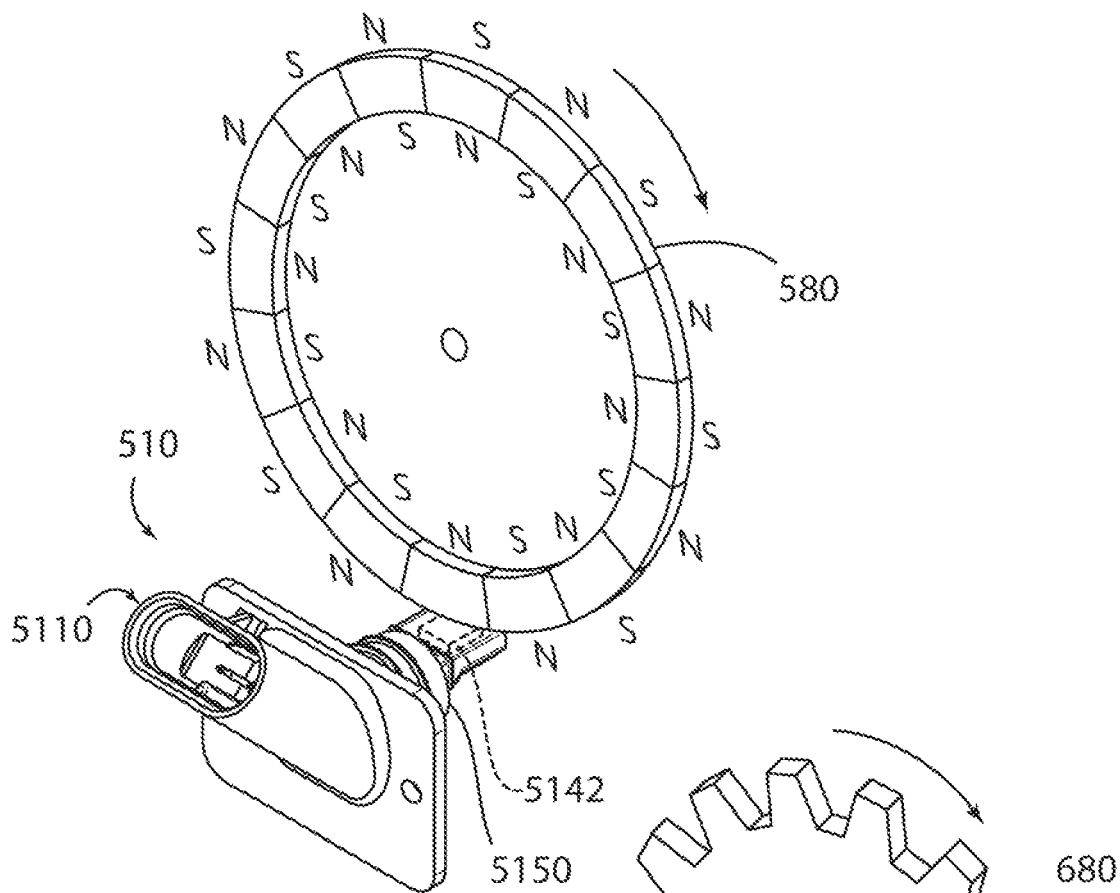
FIG. 12 is a simplified exploded perspective view of a speed sensor assembly embodiment of the non-contacting sensor assembly of the present invention.
Figure 13:
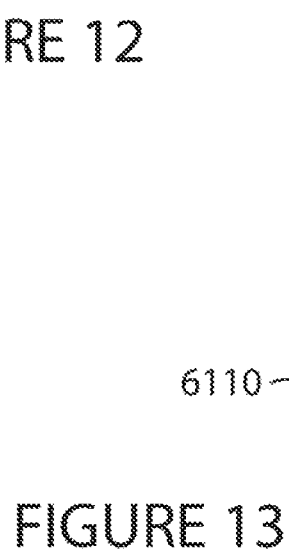
FIG. 13 is another simplified exploded perspective view of a speed sensor assembly embodiment of the non-contacting sensor assembly of the present invention.

FIGS. 12 and 13 depict respective speed sensor assembly embodiments 510 and 610 of the non-contacting sensor assembly of the present invention.

In FIG. 12, the speed sensor assembly 510 initially comprises a connector assembly 5110 incorporating all of the features and elements of the connector assembly 110 of the sensor assembly 10 shown in FIGS. 1-8 including, but not limited to, a sensor assembly including a sensor 5142 coupled directly to terminals (not shown) identical to the terminals 130, 132, and 134, and a sleeve 5150 identical to the sleeve 150 and thus the description of these and the other elements of the connector assembly 110 are incorporated herein by reference with respect to the connector assembly 5110.

The speed sensor assembly 510 additionally comprises a permanent magnet wheel 580 which has a number of segments of alternating North (N) and South (S) orientations extending around the circumferential edge thereof. The wheel 580 is mounted above the connector assembly 5110 in a relationship wherein the sensor 5142 is located below the segments on the wheel 580 of alternating North (N) and South (S) orientations so as to allow the sensor 5142 to sense the changes in magnetic field in response to rotation of the magnet wheel 580 relative to the sensor 5142.

In FIG. 13, the speed sensor assembly 610 initially comprises a connector assembly 6110 incorporating all of the features and elements of the connector assembly 110 of the sensor assembly 10 shown in FIGS. 1-8 including, but not limited to, a sensor assembly including a sensor 6142 coupled directly to terminals (not shown) identical to the terminals 130, 132, and 134, and a sleeve 6150 identical to the sleeve 150 and thus the description of these and the other elements of the connector assembly 110 are incorporated herein by reference with respect to the connector assembly 6110.

The speed sensor assembly 610 additionally comprises a wheel 680 which is made of ferromagnetic material such as, for example, steel and which includes a plurality of notches 681 defined therein and extending circumferentially around the peripheral edge of the wheel 680. The wheel 680 is located above the connector assembly 6110 in a relationship wherein the sensor 6142 is located below the notches 681. In this embodiment, a magnet (not shown) may be positioned below or behind the sensor 6142 in the interior of the sleeve 5150 and the sensor output will change from high to low as the notches 681 pass over or in front of the sensor 6142.

In both of the FIGS. 12 and 13 embodiments, the respective wheels 580 and 680 are attached to a rotating shaft (not shown) that produces an alternating output from the respective sensors 5142 and 6142 which is proportional to the rotational speed of the rotating shaft (not shown).

I claim:

1. A sensor assembly comprising a connector assembly with a plurality of terminals, and a sensor including a plurality of leads coupled directly to the plurality of terminals respectively of the connector assembly, wherein the connector assembly includes a neck defining a groove and the sensor assembly further comprising a protective sleeve including a rim extending into the groove of the neck of the connector assembly for coupling the protective sleeve to the connector assembly and an outer surface surrounding the plurality of terminals of the connector assembly, the plurality of leads of the sensor, and the sensor.

2. The sensor assembly of claim 1 wherein the protective sleeve is made of an elastomeric material overmolded around the sensor, the plurality of leads of the sensor, and the plurality of terminals of the connector assembly.

3. The sensor assembly of claim 1 comprising a rotary sensor assembly comprising a housing, a rotatable drive arm assembly located in the housing, a magnet assembly located in the housing and coupled to the drive arm assembly and including a pair of spaced-apart magnets, the sensor extending into the housing between the pair of spaced-apart magnets.

4. A sensor assembly comprising a connector assembly with a plurality of terminals, and a sensor including a plurality of leads coupled directly to the plurality of terminals respectively of the connector assembly, wherein the plurality of terminals of the connector assembly include respective terminal segments protruding outwardly from the connector assembly, the plurality of leads of the sensor being coupled directly to the respective terminal segments of the plurality of terminals, the sensor assembly further comprising an electrical element seated on and extending between the terminal segments of at least two of the plurality of terminals of the connector assembly.

5. A sensor assembly comprising a connector assembly with a plurality of terminals, and a sensor including a plurality of leads coupled directly to the plurality of terminals respectively of the connector assembly, wherein the plurality of terminals include respective first spaced segments fixed in the connector assembly and respective second spaced free segments protruding out of the connector assembly, the plurality of leads of the sensor being coupled directly to the respective second free segments of the plurality of terminals, the sensor assembly further comprising an electrical element mounted on and extending between the second free segments and the spacing between the second free segments of the plurality of terminals being less than the spacing between the first segments of the plurality of terminals.

6. A sensor assembly comprising:
a connector assembly including a plurality of terminals;
a sensor including a plurality of leads coupled directly to the plurality of terminals respectively;
a protective sleeve made of an elastomeric material that is overmolded onto the plurality of terminals and the plurality of leads and the sensor; and
a housing including an interior cavity defined by an interior surface, the sensor extending into the interior cavity and the protective sleeve including at least a first rib made of the elastomeric material of the protective sleeve and abutting against the interior surface of the housing for providing a seal between the connector assembly and the housing.

7. The sensor assembly of claim 6 further comprising a rotatable drive arm assembly located in the housing, a magnet assembly located in the housing and coupled to the drive arm assembly and including a pair of spaced-apart magnets, the sensor extending into the housing between the pair of spaced-apart magnets.

8. A rotary position sensor assembly comprising:
a housing defining an interior cavity;
a drive arm assembly mounted for rotation in the interior cavity of the housing;
a magnet assembly located in the interior cavity of housing and molded into the drive arm assembly;
a connector assembly coupled to the housing and including terminals extending into the interior cavity of the housing;
a sensor located in the interior cavity in a relationship spaced from the magnet assembly, the sensor assembly being coupled to the terminals of the connector assembly; and
a protective sleeve surrounding the sensor and the terminals of the connector assembly, wherein the sensor includes a plurality of leads coupled directly to a plurality of terminals of the connector assembly respectively and the protective sleeve is made of an elastomeric material and is overmolded to the sensor and the plurality of leads of the sensor and the plurality of terminals of the connector assembly.

9. A rotary position sensor assembly comprising:
a housing defining an interior cavity;
a drive arm assembly mounted for rotation in the interior cavity of the housing;
a magnet assembly located in the interior cavity of the housing and molded into the drive arm assembly;
a connector assembly coupled to the housing and including a plurality of terminals extending into the interior cavity of the housing;
a sensor located in the interior cavity in a relationship spaced from the magnet assembly, the sensor assembly including a plurality of leads coupled directly to the terminals of the connector assembly, wherein the plurality of terminals of the connector assembly include respective segments extending outwardly from the connector assembly and into the housing, the plurality of leads of the sensor being coupled directly to the respective segments of the plurality of terminals, the respective segments of the plurality of terminals being spaced from each other and one or more of the segments of the plurality of terminals defining a recess and a capacitor is seated in the recess and extends between the segments of the plurality of terminals; and
a protective sleeve surrounding the sensor and the terminals of the connector assembly.

* * * * *